(12) United States Patent
Kato et al.

(10) Patent No.: US 11,524,652 B2
(45) Date of Patent: Dec. 13, 2022

(54) CURTAIN AIRBAG AND MANUFACTURING METHOD THEREFOR

(71) Applicant: Autoliv Development AB, Vargarda (SE)

(72) Inventors: Tomoya Kato, Kanagawa (JP); Takashi Murayama, Kanagawa (JP); Ryota Ishigaki, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/309,803

(22) PCT Filed: Dec. 2, 2019

(86) PCT No.: PCT/JP2019/047029
§ 371 (c)(1),
(2) Date: Jun. 18, 2021

(87) PCT Pub. No.: WO2020/129590
PCT Pub. Date: Jun. 25, 2020

(65) Prior Publication Data
US 2022/0055567 A1 Feb. 24, 2022

(30) Foreign Application Priority Data
Dec. 20, 2018 (JP) .............................. JP2018-238812

(51) Int. Cl.
*B60R 21/232* (2011.01)
*B60R 21/237* (2006.01)
(Continued)

(52) U.S. Cl.
CPC .......... *B60R 21/232* (2013.01); *B60R 21/201* (2013.01); *B60R 21/237* (2013.01);
(Continued)

(58) Field of Classification Search
CPC ... B60R 21/232; B60R 21/237; B60R 21/213; B60R 21/23138; B60R 21/2338;
(Continued)

(56) References Cited

U.S. PATENT DOCUMENTS 6,736,422 B2 * 5/2004 Nakanishi ............. B60R 21/231
280/730.2
8,382,151 B2 * 2/2013 Kalandek .............. B60R 21/232
280/730.2
(Continued)

FOREIGN PATENT DOCUMENTS

JP 2000-296752 A 10/2000
JP 2007-161167 A 6/2007
(Continued)

*Primary Examiner* — Keith J Frisby
(74) *Attorney, Agent, or Firm* — Harness, Dickey & Pierce, P.L.C.; Stephen T. Olson

(57) ABSTRACT

A curtain airbag attached to a vehicle body and expanded and deployed by a gas from an inflator containing: a first region along a lower edge; a second region adjacent above the first region with a first fold line; a third region adjacent above the second region with a second fold line formed on an opposite side of the first fold line across the second region. The first region is in a condition folded back at the first fold line to face a first surface side of the second region, the second region is in a condition folded back at the second fold line such that the folded back first region is between the second region and the third region, the third region is in a condition rolled upward on a second surface side. Rolling starts from the second fold line.

11 Claims, 16 Drawing Sheets

(51) Int. Cl.
*B60R 21/2338* (2011.01)
*B60R 21/201* (2011.01)
*B60R 21/235* (2006.01)

(52) U.S. Cl.
CPC ............... *B60R 2021/23386* (2013.01); *B60R 2021/23538* (2013.01); *B60R 2021/23576* (2013.01)

(58) Field of Classification Search
CPC ........ B60R 21/214; B60R 2021/23538; B60R 2021/23386; B60R 2021/23576
USPC ............................................ 280/730.2, 743.2
See application file for complete search history.

(56) References Cited

U.S. PATENT DOCUMENTS

| | | | | |
|---|---|---|---|---|
| 8,540,279 | B2 * | 9/2013 | Jun | B60R 21/232 |
| | | | | 280/730.2 |
| 9,896,057 | B2 * | 2/2018 | Fischer | B60R 21/23138 |
| 10,214,173 | B2 * | 2/2019 | Asada | B60R 21/213 |
| 10,836,342 | B2 * | 11/2020 | Hayashi | B60R 21/213 |
| 2007/0182142 | A1 * | 8/2007 | Schimpff | B60R 21/237 |
| | | | | 280/743.1 |
| 2010/0007121 | A1 | 1/2010 | Mendez | |
| 2015/0336531 | A1 * | 11/2015 | Kawamura | B60R 21/232 |
| | | | | 280/730.2 |
| 2015/0375710 | A1 | 12/2015 | Sievers et al. | |
| 2017/0327073 | A1 * | 11/2017 | Arima | B60R 21/213 |
| 2020/0108792 | A1 * | 4/2020 | Ohno | B60R 21/232 |
| 2020/0269799 | A1 * | 8/2020 | Iwata | B60R 21/201 |

FOREIGN PATENT DOCUMENTS

| | | |
|---|---|---|
| JP | 2015-39928 A | 3/2015 |
| JP | 2015-85787 A | 5/2015 |
| JP | 5762108 B2 * | 8/2015 |
| JP | 2016-22918 A | 2/2016 |
| JP | 2016022918 A * | 2/2016 |

\* cited by examiner

[FIG. 1]
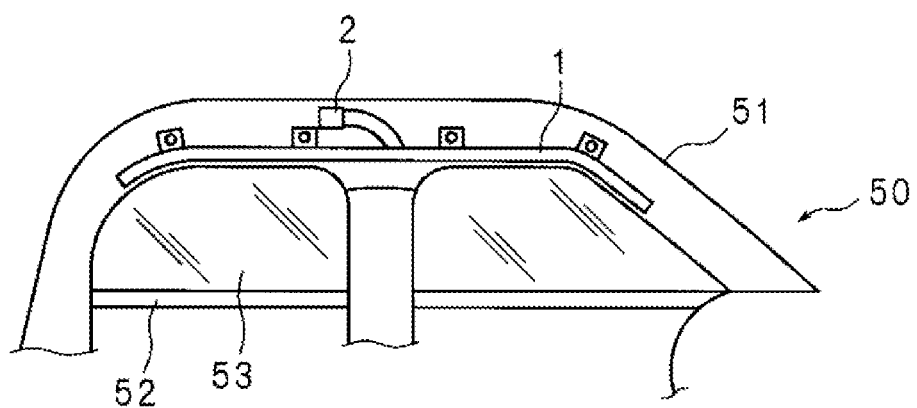

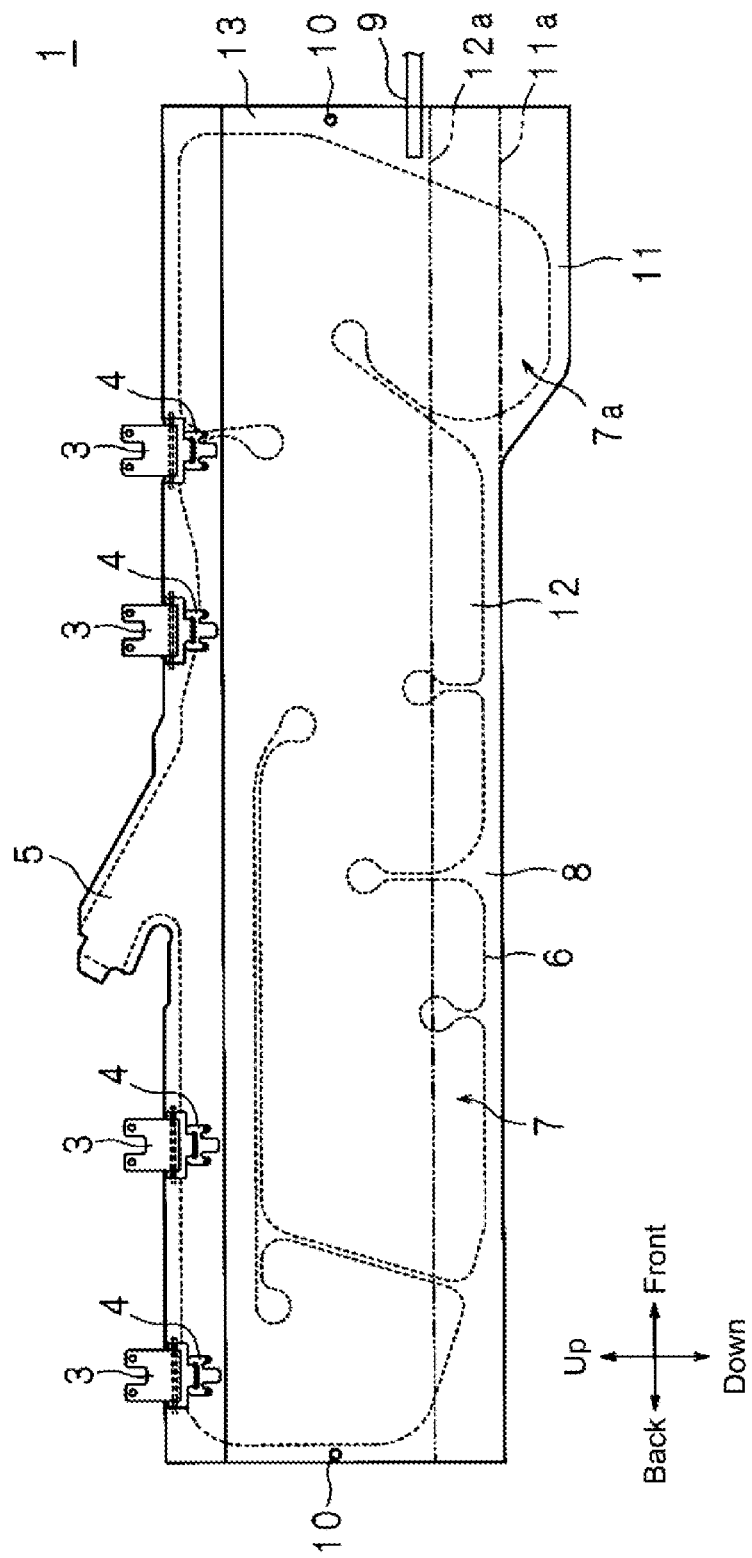
[FIG. 2]

[FIG. 3]
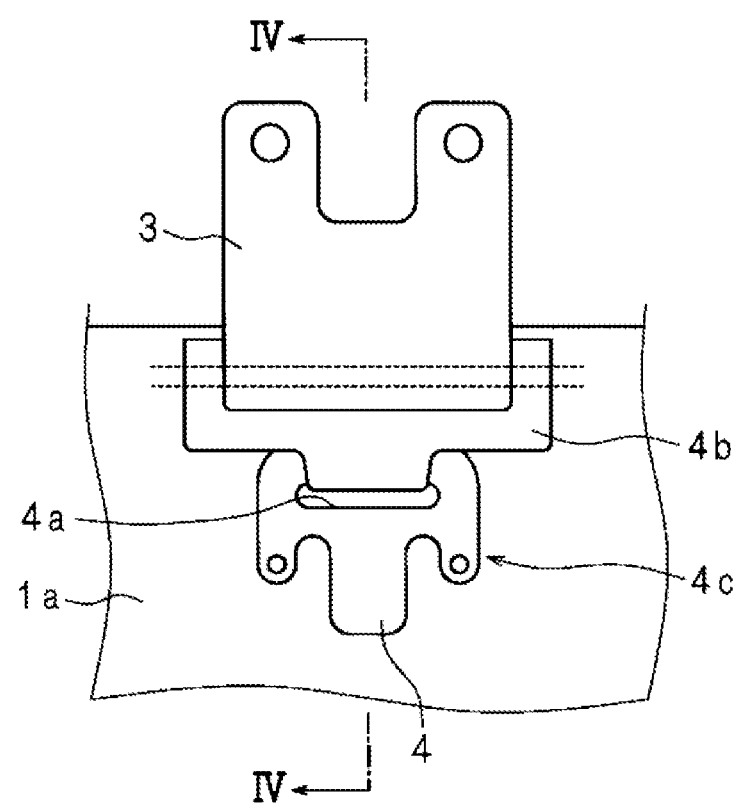

[FIG. 4]
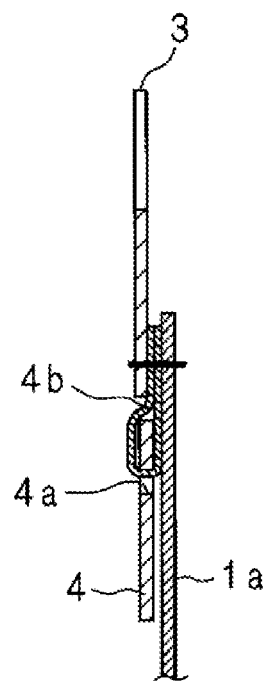

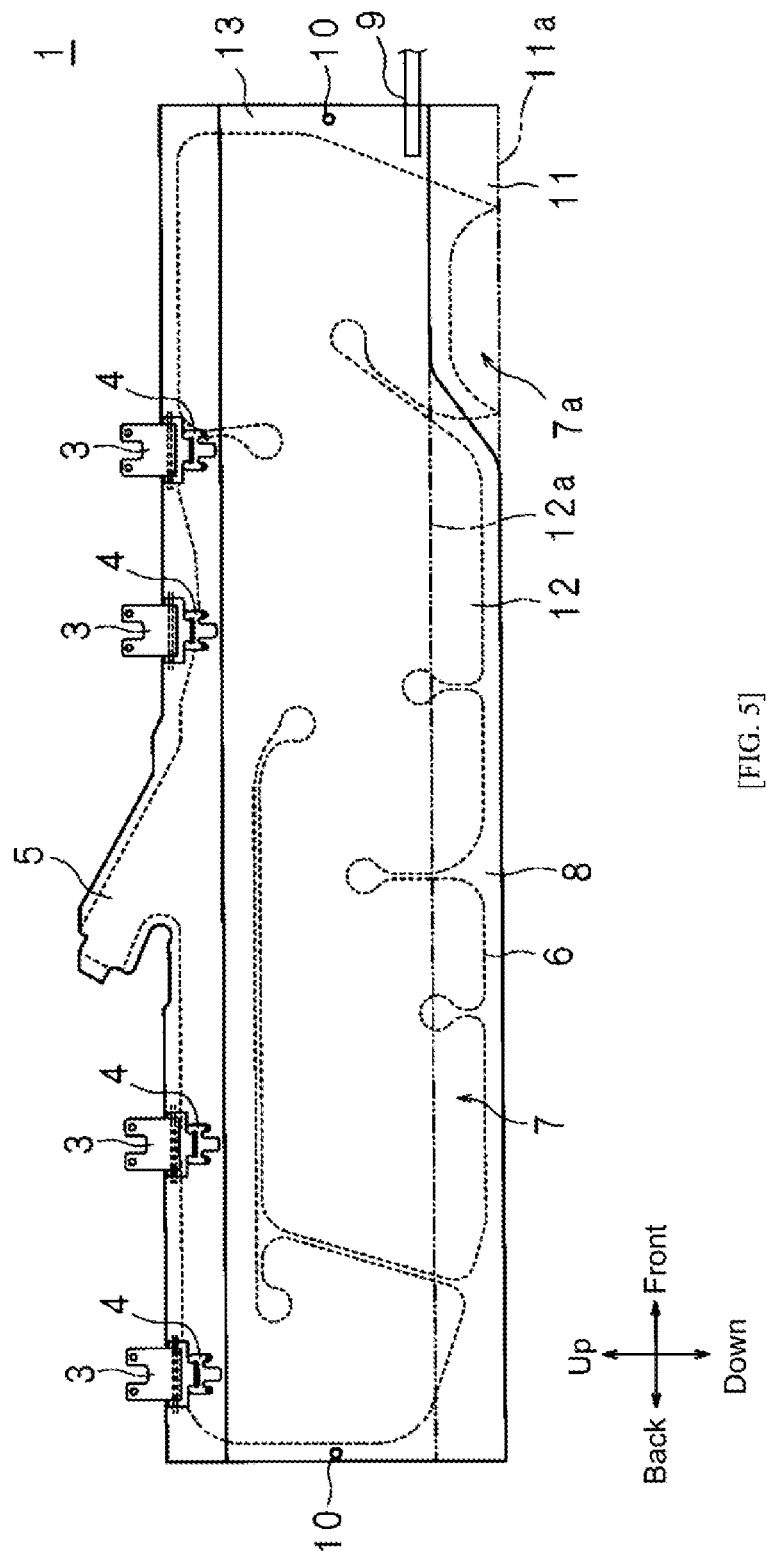
[FIG. 5]

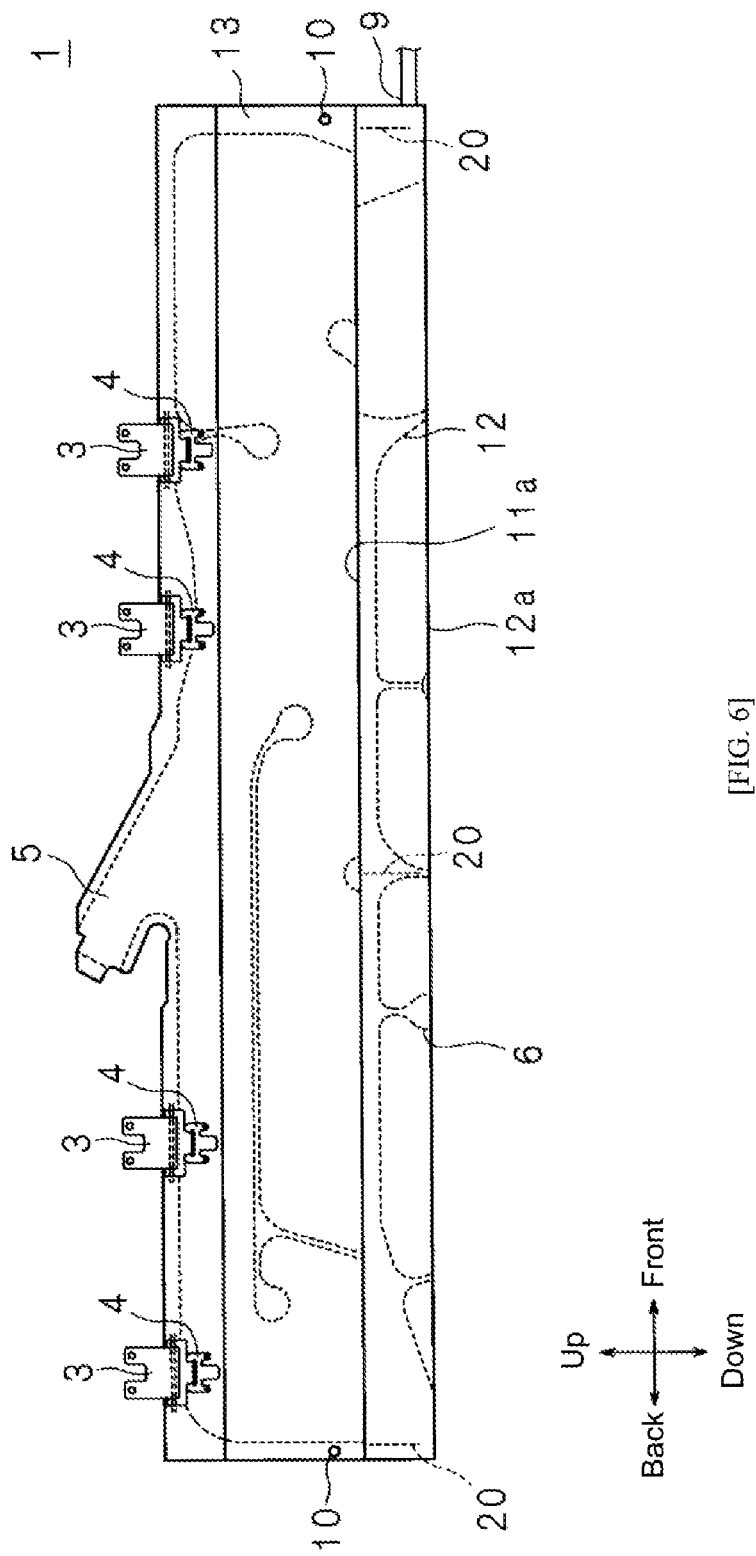
[FIG. 6]

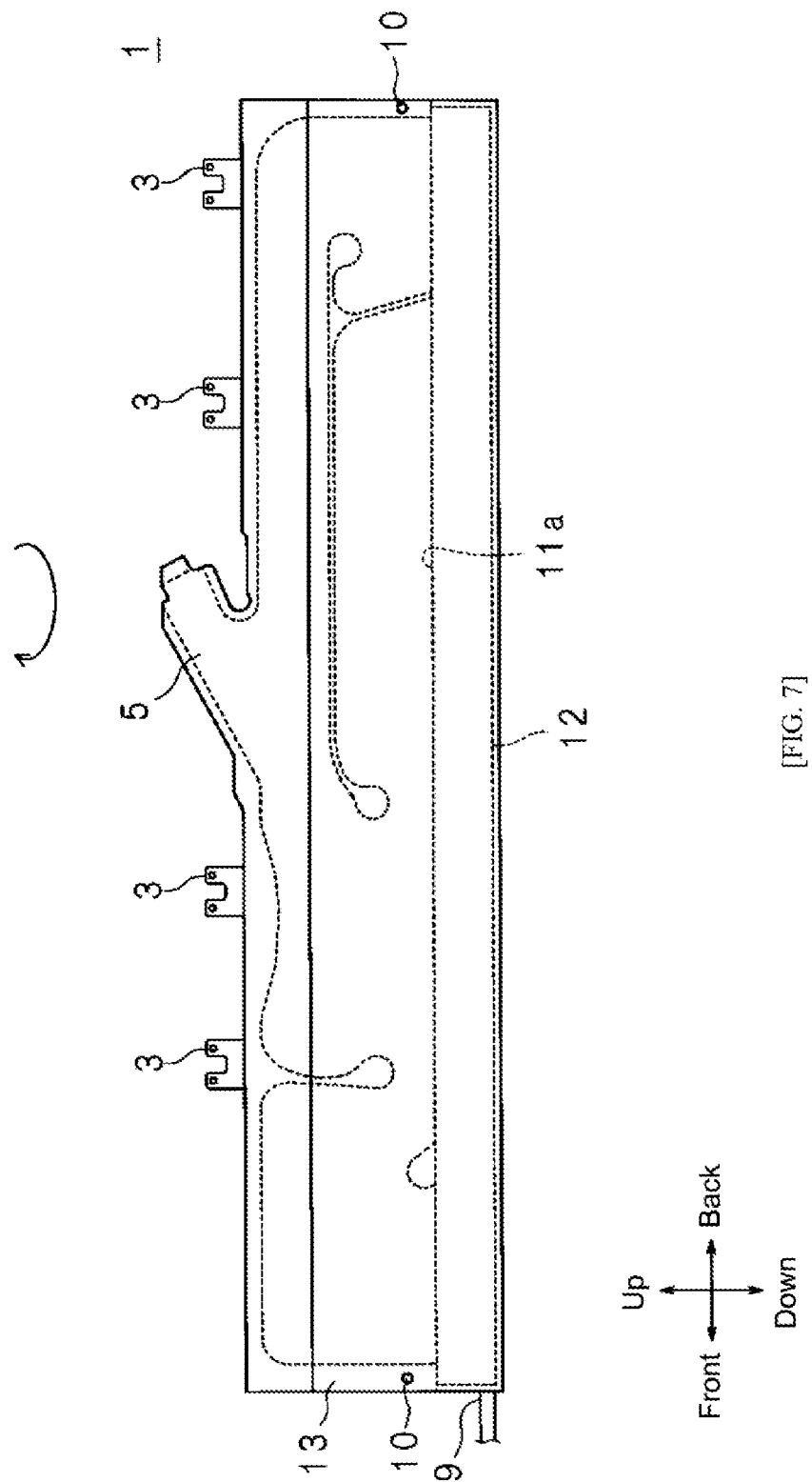
[FIG. 7]

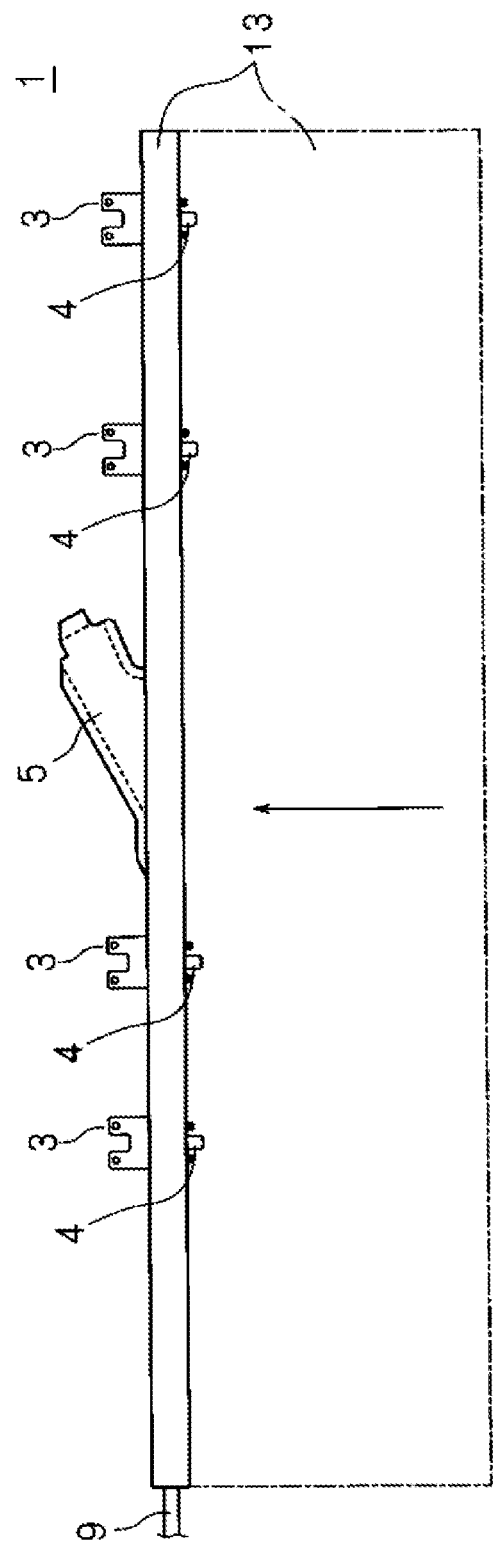
[FIG. 8]

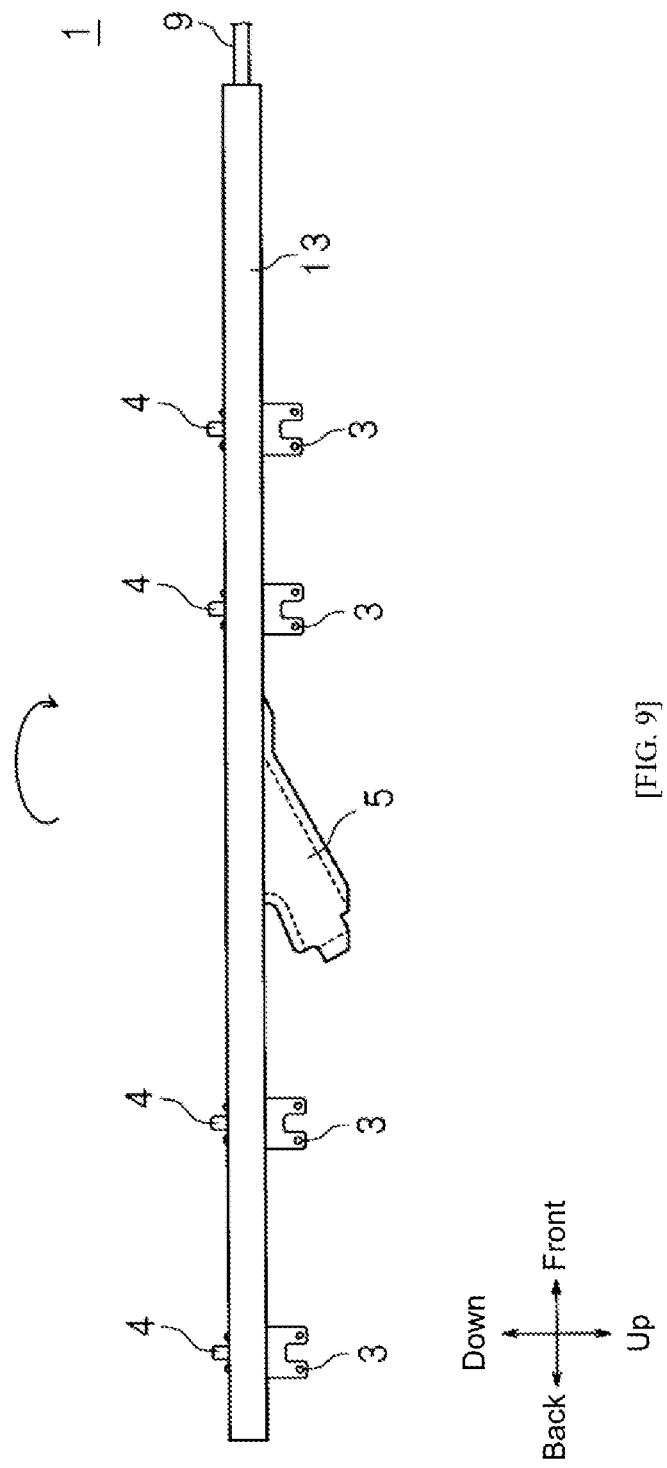
[FIG. 9]

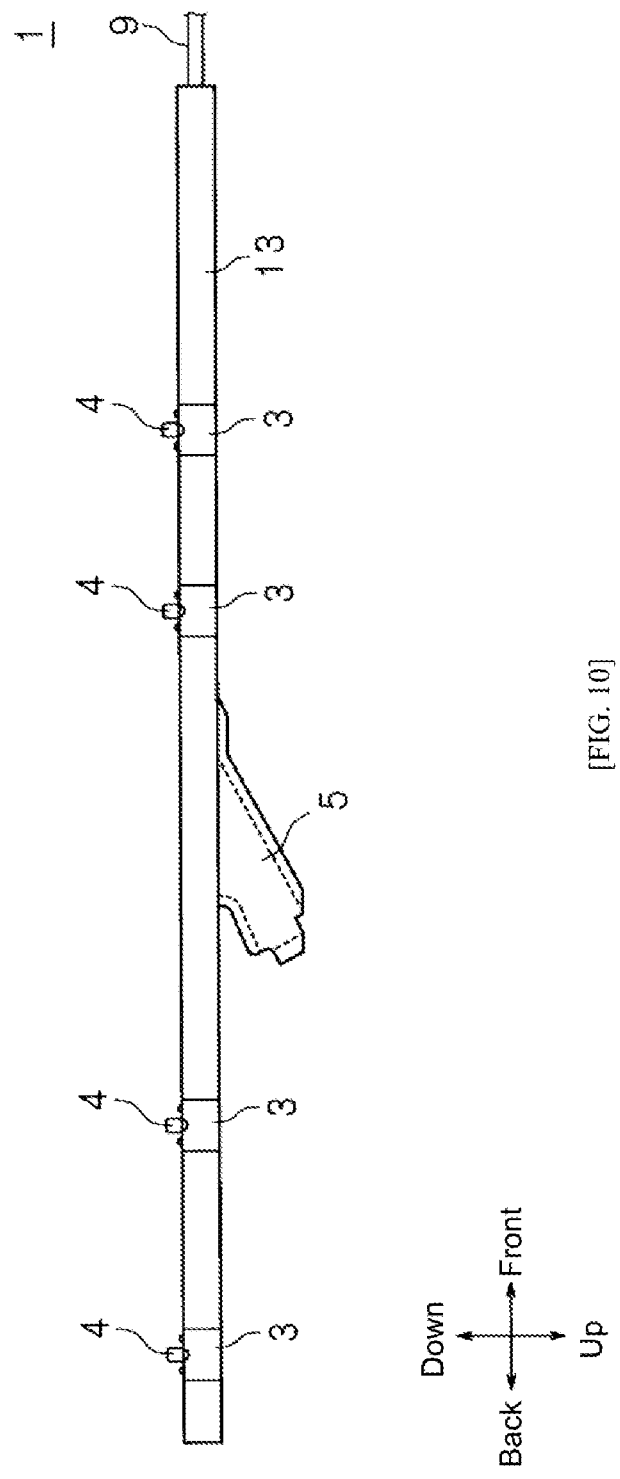
[FIG. 10]

[FIG. 11A]
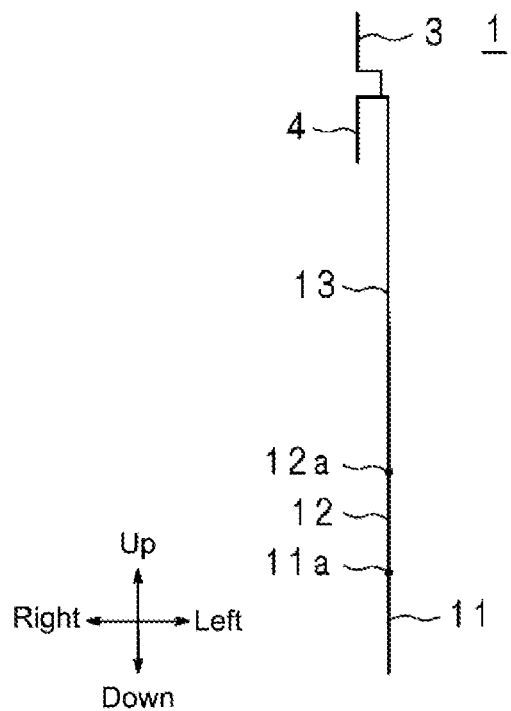
[FIG. 11B]
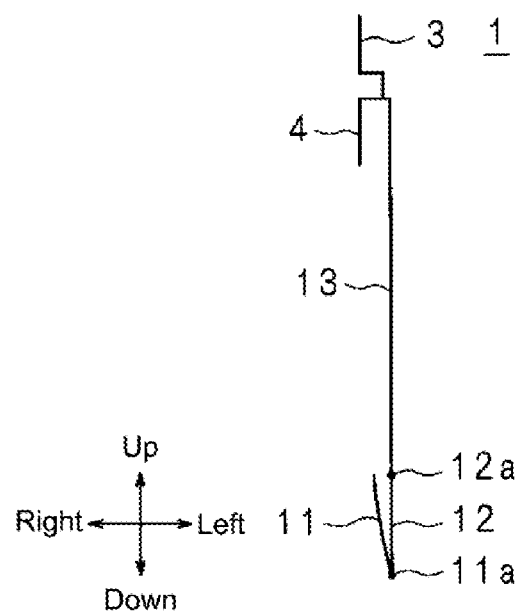

[FIG. 11C]
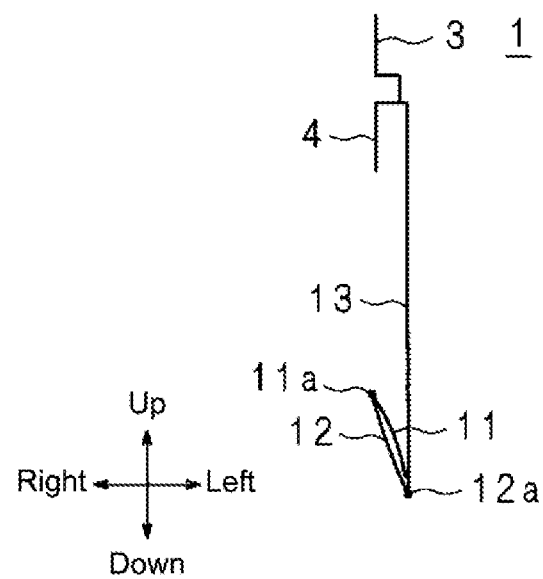
[FIG. 11D]
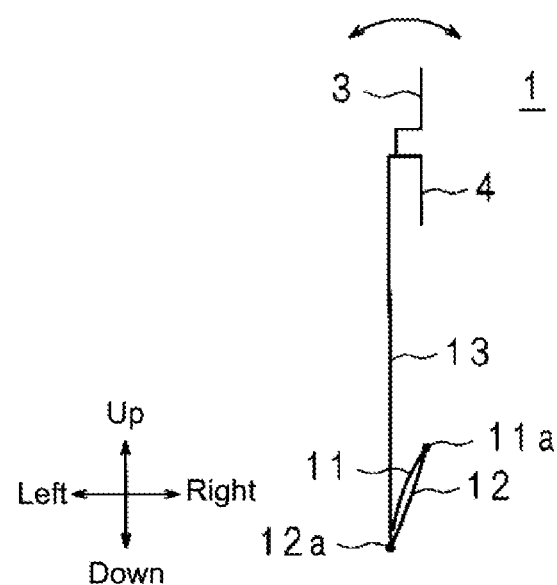

[FIG. 11E]
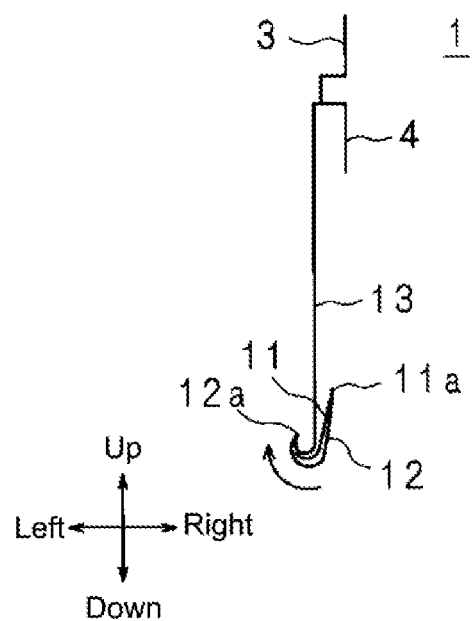
[FIG. 11F]
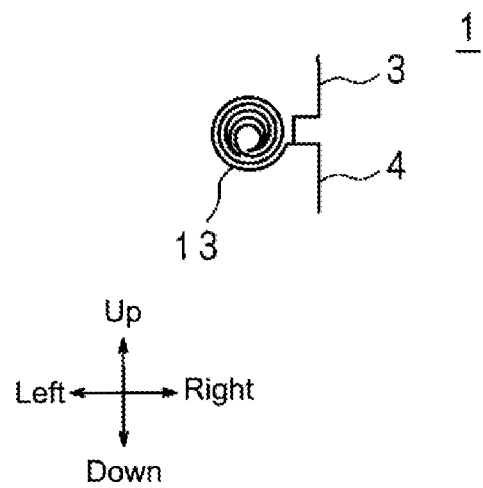

[FIG. 11G]
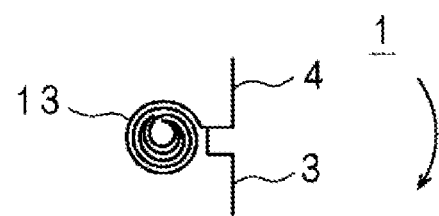
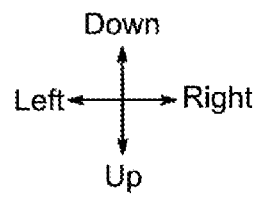
[FIG. 11H]
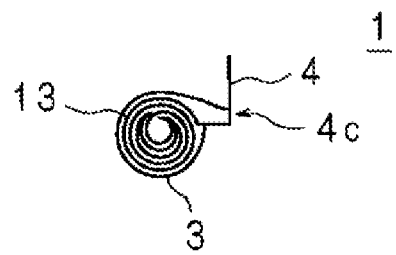
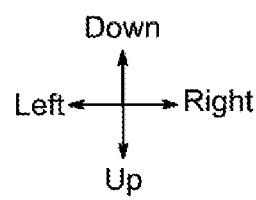

[FIG. 12A]
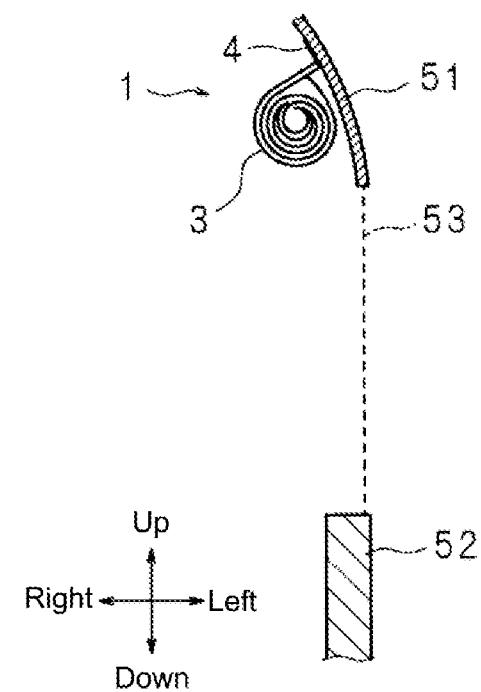
[FIG. 12B]
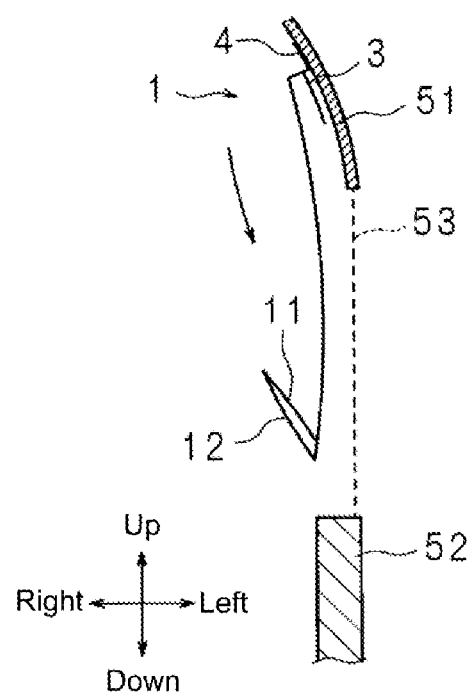

[FIG. 12C]
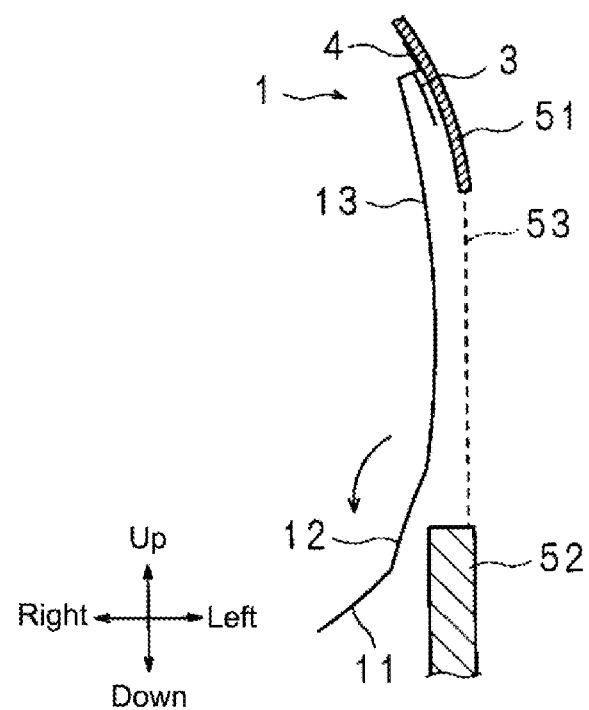

CURTAIN AIRBAG AND MANUFACTURING METHOD THEREFOR

TECHNICAL FIELD

The present technology relates to a curtain airbag and a manufacturing method thereof.

BACKGROUND ART

In recent years, many vehicles are equipped with an airbag device in order to protect an occupant in the event of a collision. Some models are equipped with a curtain airbag device. A curtain airbag device is provided with a curtain airbag folded and stored on an upper side of a door of a vehicle and an inflator that operates in the event of a vehicle collision to inject gas into the curtain airbag. The curtain airbag expands and deploys in a vehicle cabin based on a function of the injected gas of the inflator, and an occupant is retained by the expanded and deployed airbag and protected from a side collision into each portion in the vehicle cabin (for example, refer to Patent Document 1).

PRIOR ART DOCUMENTS

Patent Documents

Patent Document 1: JP 2016-22918 A

SUMMARY OF THE INVENTION

Problems to be Solved by the Invention

During deployment, a lower end portion of a front portion of a curtain airbag protrudes lower than another portion. When stored, the curtain airbag is rolled such that a protruding portion is positioned at a center. In the event of a collision from an oblique direction, an inertial force directed outside the vehicle acts on the curtain airbag, and thus the protruding portion may exit the vehicle through the window, which may reduce occupant protection performance.

In view of the foregoing, an object of the present disclosure is to provide a curtain airbag where reduction in occupant protection performance can be suppressed even when a collision occurs from an oblique direction and a manufacturing method thereof.

Means for Solving the Problems

A curtain airbag according to the present disclosure is a curtain airbag attached to a vehicle body that expands and deploys by a gas supplied from an inflator, and that has a first surface and a second surface, containing: a first region along a lower edge; a second region adjacent to and above the first region with a first fold line as a boundary; a third region adjacent to and above the second region with a second fold line formed on an opposite side of the first fold line across the second region as a boundary; where the first region is in a condition folded back at the first fold line so as to face a first surface side of the second region, the second region is in a condition folded back at the second fold line such that the folded back first region is sandwiched between the second region and the third region, the third region is in a condition rolled upward on a second surface side, with the rolling beginning from the second fold line, and in a condition stored attached to the vehicle body, the first region and the second region are provided to an inner side of the third region.

In the present disclosure, the first region along an edge, for example, the lower edge portion at the time of deployment, is folded back at the first fold line, the second region is folded back at the second fold line in a condition where the first region is folded back, and the first region and the second region are disposed on the first surface side of the curtain airbag. The third region is rolled on the second surface side of the curtain airbag, in other words, on an opposite side of the first and second regions. Therefore, when the curtain airbag is disposed with the second surface of the curtain airbag facing to an outer side, even if an inertial force toward the outside of the vehicle acts on the deploying curtain airbag, the first and second regions open toward an inside of the vehicle and thus do not exit the vehicle.

In the curtain airbag according to the present disclosure, the first fold line is formed so as to be disposed on an upper edge portion of a door trim of the vehicle body.

In the present disclosure, during deployment, the first fold line is disposed at the upper edge portion of the door trim, such that the first region can be easily deployed to an inner side of the door.

In the curtain airbag according to the present disclosure, the first region is disposed on a front side of the vehicle body during deployment and includes a downwardly expanding portion that extends below the upper edge portion of the door trim of the vehicle body.

In the present disclosure, the downwardly expanding portion expands to the inner side of the door and can prevent the occupant from impacting the door.

The curtain airbag according to the present disclosure contains a strap where a first end portion is secured to the vehicle body and a second end portion is attached to an end portion in a front-rear direction so as to be pulled in the front-rear direction of the vehicle body, where the strap is disposed above the second fold line in an up-down direction of the vehicle body and within a range of an upper-lower width of the folded back second region.

In the present disclosure, the second region is disposed on a lower side than a strap to which pulling is applied, and therefore, the first and second regions are deployed at a high speed.

In the curtain airbag according to the present disclosure, the first region, second region, and third region have non-expanding portions, and the curtain airbag further contains a temporary stitched portion that temporarily retains the first region and the second region folded back at the second fold line and the third region at the non-expanding portion.

In the present disclosure, providing the temporary stitched portion can prevent the first and second regions from unfolding when the third region is rolled. Furthermore, the temporary stitched portion is provided in the non-expanding portion, and therefore, the temporary stitched portion does not interfere with the expansion of the curtain airbag.

In the curtain airbag according to the present disclosure, the temporary stitched portion is provided at an end portion and an intermediate portion in the front-rear direction of the vehicle body.

In the present disclosure, temporarily securing end portions in the front-rear direction and the intermediate portion can prevent the first and second regions from shifting positions with regard to a rolling device when the airbag is rolled using the rolling device.

The curtain airbag according to the present disclosure contains an expanding portion demarcated by seams, where the non-expanding portion is disposed between the seams.

In the present disclosure, a stitched portion is provided between the seams, and therefore, the stitched portion does not affect expansion of the curtain airbag.

In the curtain airbag according to the present disclosure, the widths of the first region and the second region in the up-down direction of the vehicle body are equal.

In the present disclosure, when a region to be folded is minimized, and the up-down position of the first fold line is set, the position of the second fold line is also naturally set, and thus setting the first fold line and second fold line is simple.

In the curtain airbag according to the present disclosure, a latching hole for latching to a rolling device is disposed on an upper side of the second region.

In the present disclosure, the latching hole is formed in the thin third region, avoiding the thick folded back region, to facilitate formation of the latching hole.

The method of manufacturing a curtain airbag according to the present disclosure is a method of manufacturing a curtain airbag attached to a vehicle body that expands and deploys by a gas supplied from an inflator, and that has a first surface and a second surface, including the steps of: folding back a first region along a lower edge of a deployed curtain airbag at a first fold line such that the first region faces the first surface of a second region adjacent to and above the first region with the first fold line as a boundary; folding back the second region at a second fold line such that the folded back first region is sandwiched between the second region and a third region adjacent to and above the second region with the second fold line as a boundary; temporarily retaining the folded back first and second regions and the third region; and rolling upward the third region on a second surface side, with the rolling beginning from the second fold line.

In the present disclosure, the first region along an edge, for example, the lower edge portion at the time of deployment, is folded back at the first fold line, the second region is folded back at the second fold line in a condition where the first region is folded back, and the first region and the second region are disposed on the first surface side of the curtain airbag. The third region is rolled on the second surface side of the curtain airbag, in other words, on an opposite side of the first and second regions. Therefore, when the curtain airbag is disposed with the second surface of the curtain airbag facing to an outer side, even if an inertial force toward the outside of the vehicle acts on the deploying curtain airbag, the first and second regions open toward an inside of the vehicle and thus do not exit the vehicle.

Effect of the Invention

In the curtain airbag and manufacturing method thereof according to the present disclosure, the first region along an edge, for example, the lower edge portion at the time of deployment, is folded back at the first fold line, the second region is folded back at the second fold line in a condition where the first region is folded back, and the first region and the second region are disposed on the first surface side of the curtain airbag. The third region is rolled on the second surface side of the curtain airbag, in other words, on an opposite side of the first and second regions. Therefore, when the curtain airbag is disposed with the second surface of the curtain airbag facing to an outer side, and even if an inertial force toward the outside of the vehicle acts on the deploying curtain airbag, the first and second regions open toward an inside of the vehicle and do not exit the vehicle. Thus, a reduction in occupant protection performance can be suppressed.

BRIEF DESCRIPTION OF THE DRAWINGS

FIG. 1 is a schematic side surface view illustrating a curtain airbag in an attached condition.

FIG. 2 is a schematic right side surface view illustrating a deployed airbag.

FIG. 3 is a partially enlarged right side surface view illustrating a tab and a securing tool.

FIG. 4 is a cross sectional view taken along line IV-IV illustrated in FIG. 3 as a cutting line.

FIG. 5 is a side surface view of an airbag describing a method of manufacturing an airbag.

FIG. 6 is a side surface view of an airbag describing a method of manufacturing an airbag.

FIG. 7 is a side surface view of an airbag describing a method of manufacturing an airbag.

FIG. 8 is a side surface view of an airbag describing a method of manufacturing an airbag.

FIG. 9 is a side surface view of an airbag describing a method of manufacturing an airbag.

FIG. 10 is a side surface view of an airbag describing a method of manufacturing an airbag.

FIG. 11A is a schematic front surface view of an airbag describing a method of manufacturing an airbag.

FIG. 11B is a schematic front surface view of an airbag describing a method of manufacturing the airbag.

FIG. 11C is a schematic front surface view of an airbag describing a method of manufacturing the airbag.

FIG. 11D is a schematic rear surface view of an airbag describing a method of manufacturing the airbag.

FIG. 11E is a schematic rear surface view of an airbag describing a method of manufacturing the airbag.

FIG. 11F is a schematic rear surface view of an airbag describing a method of manufacturing the airbag.

FIG. 11G is a schematic front surface view of an airbag describing a method of manufacturing the airbag.

FIG. 11H is a schematic front surface view of an airbag describing a method of manufacturing the airbag.

FIG. 12A is a schematic cross sectional view describing expansion and deployment of an airbag.

FIG. 12B is a schematic cross sectional view describing expansion and deployment of the airbag.

FIG. 12C is a schematic cross sectional view describing expansion and deployment of the airbag.

MODE FOR CARRYING OUT THE INVENTION

The present invention will be described below based on drawings illustrating a curtain airbag 1 according to an embodiment. FIG. 1 is a schematic side surface view illustrating a curtain airbag in an attached condition. The curtain airbag (hereinafter, airbag) 1 is provided in a roof side rail part 51 of a vehicle body 50 and is covered by a headlining (not shown). An inflator 2 is provided on the roof side rail part 51. A door trim 52 is provided below the roof side rail part 51, and a window glass 53 is disposed between the roof side rail part 51 and the door trim 52. The inflator 2 supplies a gas into the airbag 1.

FIG. 2 is a schematic right side surface view of the deployed airbag 1, FIG. 3 is a partially enlarged right side surface view illustrating a tab 3 and a securing tool 4, and FIG. 4 is a cross sectional view with line IV-IV illustrated in FIG. 3 as a cutting line. The airbag 1 is a bag-like object where sheet materials that are symmetrically shaped are overlappingly integrated. Note that in the present embodiment, an example is described where the airbag 1 is configured from two pieces of material such as a woven material or the like stitched into a bag shape, but may be manufactured from a single piece of a woven material stitched into a bag shape from the beginning.

A plurality of the tabs 3 are protruded from an upper side in a longitudinal direction (front-rear direction) of the airbag 1 having a rectangular shape at a predetermined distance. Furthermore, a plurality of the securing tools 4 corresponding to the tabs 3 are provided on the airbag 1 on a lower side of the tabs 3. An opening 4a is formed on an upper portion of the securing tool 4, and a tab latching part 4c for latching the tab 3 is formed on a lower portion of the securing tool 4. A loop shaped base fabric 4b is inserted into the opening 4a, and the securing tool 4 is attached to a base fabric 1a of the airbag 1 via the loop shaped base fabric 4b. The securing tool 4 is rotatable about an axis parallel to the front-rear direction with regard to the base fabric 1a by the loop shaped base fabric 4b. The tab 3 and the loop shaped base fabric 4b are integrally provided by stitching to the base fabric 1a of the airbag 1. The tab 3 and securing tool 4 are disposed on a right surface of the airbag 1, for example.

The tab 3 goes around the rolled or folded airbag 1 at least once in a circumferential direction in order to retain the airbag 1 in the rolled or folded condition and is latched on the tab latching part 4c of the securing tool 4. For example, the tab latching part 4c is a protruding part, and the tab 3 has a through hole and is formed from a stretchable fabric. When the tab latching part 4c is inserted into the through hole of the tab 3, the tab 3 is latched on the tab latching part 4c. The airbag 1 is attached to the roof side rail part 51 of the vehicle body 50 by the securing tool 4. Furthermore, a connecting part 5 for connecting to the inflator 2 is provided at a center in the front-rear direction on an upper edge portion of the airbag 1. The connecting part 5 protrudes upwardly from the upper edge portion of the airbag 1.

A lower side portion in a front portion of the airbag 1 protrudes downwardly to form the first region 11. A first fold line 11a extending in the front-rear direction is formed at a boundary between the first region 11 and a portion other than the first region 11 of the airbag 1. The first fold line 11a is essentially parallel to a lower edge of the airbag 1. A region adjacent to an upper side of the first region 11 forms a second region 12. The second region 12 has a rectangular shape extending in the front-rear direction, and upper-lower widths of the second region 12 are essentially equal width as the first region 11. A region adjacent to an upper side of the second region 12 forms a third region 13. A second fold line 12a is formed at a boundary between the second region 12 and the third region 13.

The airbag 1 is provided with a seam 6, and the seam 6 separates an expanding portion 7 and a non-expanding portion 8. The expanding portion 7 and the non-expanding portion 8 are formed across the first region 11, the second region 12, and the third region 13. The non-expanding portion 8 includes a portion formed around in a periphery of the airbag 1 and a portion extending from the portion to a center portion. The expanding portion 7 is primarily formed in the center portion of the airbag 1 and includes a downwardly expanding portion 7a formed in the first region 11. During deployment, the downwardly expanding portion 7a extends below an upper edge portion of the door trim 52.

A strap 9 is provided on an upper side of the second fold line 12a in the airbag 1. The strap 9 is long and narrow and extends in the front-rear direction. A rear end portion of the strap 9 is attached to the non-expanding portion 8 at the front edge portion of the airbag 1. A front end portion of the strap 9 is secured to the vehicle body 50, and therefore, the airbag 1 is pulled in the front-rear direction, thereby applying tension to the airbag 1. As described later, when the second region 12 is folded back to an upper side at the second fold line 12a, the strap 9 is disposed within the upper-lower widths of the folded back second region 12.

A latching hole 10 is provided on an upper side of the strap 9 for latching to a rolling device (not shown) that rolls the airbag 1. The latching hole 10 is formed in the non-expanding portion 8. As described later, when the second region 12 is folded back to an upper side at the second fold line 12a, the latching hole 10 is disposed more on an upper side than the folded back second region 12.

Next, a manufacturing method of the airbag 1 will be described. FIG. 5 to FIG. 10 are side surface views of the airbag 1, describing the method of manufacturing the airbag 1; FIG. 11A to FIG. 11C, FIG. 11G and FIG. 11H are schematic front surface views of the airbag 1, describing the method of manufacturing the airbag 1; and FIG. 11D to FIG. 11F are schematic rear surface views of the airbag 1, describing the method of manufacturing the airbag 1. As illustrated in FIG. 2 and FIG. 11A, in an initial condition, the airbag 1 is deployed. Note that front and rear surfaces herein correspond to the front-rear direction of the vehicle, and side surface corresponds to the left-right direction of the vehicle. FIG. 11A corresponds to FIG. 2, and FIG. 11B to FIG. 11D correspond to FIG. 5 to FIG. 7, respectively. FIG. 11E and FIG. 11F correspond to FIG. 8. FIG. 11G and FIG. 11H correspond to FIG. 9 and FIG. 10, respectively. FIG. 11A to FIG. 11C, FIG. 11G and FIG. 11H are views of the airbag 1 from the front, and FIG. 11D to FIG. 11F are views of the airbag from the rear.

As illustrated in FIG. 5 and FIG. 11B, the first region 11 is folded back to an upper side at the first fold line 11a such that the first region 11 faces a right side surface of the second region 12. As described above, the upper-lower widths of the first region 11 and the second region 12 are essentially equal, and therefore, the first region 11 and the second region 12 entirely overlap on a right side of the airbag 1. Herein, "right" indicates a right direction when viewing forward from a rear portion of the vehicle. "Left" indicates a left direction when viewing forward from a rear portion of the vehicle.

Furthermore, as illustrated in FIG. 6 and FIG. 11C, the second region 12 is folded back toward an upper side of the right side at the second fold line 12a such that the folded first region 11 is sandwiched between the second region 12 and the third region 13. Furthermore, the first region 11 and the second region 12 are temporarily retained at the third region 13 by a temporary stitched portion 20. The temporary stitched portion 20 connects the first region 11 and the second region 12 to the third region 13. The temporary stitched portions 20 are formed at three locations at both front and rear ends of the airbag 1 and at the center of the airbag 1 in the front-rear direction and prevents the first region 11 and the second region 12 from being misaligned with regard to the rolling device when the airbag 1 is rolled using the rolling device. The temporary stitched portion 20 is formed in the non-expanding portion 8 between the seams 6, and the temporary stitched portion 20 is cut during expansion of the airbag 1. Therefore, the temporary stitched portion 20 does not affect expansion and deployment of the airbag 1.

Next, as illustrated in FIG. 7 and FIG. 11D, the airbag 1 is turned over such that the right and left surfaces are swapped. By turning over, the front-rear and left-right directions are reversed. Therefore, in FIG. 7 and FIG. 8, arrows indicating front and rear are reversed from FIG. 5 and FIG. 6, and in FIG. 11D to FIG. 11F, arrows indicating left and right are reversed from FIG. 11A to FIG. 11C. In FIG. 7, the second region 12 is disposed on a back side of the third region 13.

Furthermore, as illustrated by the arrows in FIG. 8 and FIG. 11E, together with the folded back first region 11 and second region 12, the third region 13 is rolled up to the left surface side of the airbag 1, with the second fold line 12a as the beginning of rolling. In other words, the third region 13 is rolled in a direction opposite from a direction in which the first region 11 and the second region 12 are folded back. In FIG. 8, dash-dot chain lines indicates an outline of the airbag 1 at the beginning of rolling. As indicated by the solid lines in FIG. 8 and in FIG. 11F, the third region 13 is rolled to the vicinity of an upper end of the airbag 1.

Furthermore, as illustrated in FIG. 9 and FIG. 11G, the airbag 1 is rotated 180 degrees with the left-right direction as an axial direction, and the airbag 1 is turned upside down. Note that in FIG. 9, arrows indicating up and down are reversed from FIG. 5 to FIG. 8, and in FIG. 11G, arrows indicating up and down are reversed from FIG. 11A to FIG. 11F. Furthermore, arrows indicating front and rear in FIG. 9 are reversed from FIG. 7 and FIG. 8.

Next, as illustrated in FIG. 10 and FIG. 11H, the airbag 1 is manufactured by rolling the tab 3 around an outer circumferential surface of the roll shaped third region 13 and then attaching to the tab latching part 4c of the securing tool 4.

When attaching the airbag 1 to the vehicle body 50, the securing tool 4 is used to secure the rod shaped airbag 1 to the roof side rail part 51. Furthermore, the front end portion of the strap 9 is secured to the vehicle body 50.

FIG. 12A to FIG. 12C are schematic cross sectional views describing expansion and deployment of the airbag 1. As illustrated in FIG. 12A, the airbag 1 before deployment is disposed on an upper side of the window glass 53 on a left side surface inside the vehicle when viewed from the rear of the vehicle (in FIGS. 12A to 12C, disposed on a right side due to being viewed from the front). At this time, the airbag 1 is oriented as illustrated in FIG. 11H, in other words, an upside-down orientation, and the securing tool 4 positioned on the right side of FIG. 11H is secured to the left side surface inside the vehicle. When gas is supplied from the inflator 2, the third region 13 first begins to expand. The expansion causes the tab 3 to disengage from the securing tool 4, and the airbag 1 extends downwardly, as indicated by the arrow in FIG. 12B. Furthermore, the third region 13 is completely unrolled and deployed, leaving the first region 11 and the second region 12. Thereafter, as indicated by the arrow in FIG. 12C, the folded first region 11 and second region 12 expand and deploy to the right, in other words, toward the inside of the vehicle. The first fold line 11a of the deployed airbag 1 is disposed at the upper edge portion of the door trim 52, and the first region 11 extends below the upper edge of the door trim 52.

Note that as illustrated in FIG. 12A, when the rod shaped airbag 1 is secured inside the vehicle, the right side surface of the third region 13 faces to an outer side in a radial direction of the roll shaped airbag 1, and the left side surface faces to an inner side in the radial direction. Therefore, left-right direction of the airbag 1 and the vehicle body do not match. As illustrated in FIG. 12B and FIG. 12C, when the airbag 1 is deployed downwardly, the right side surface of the third region 13 faces the right side of the vehicle body, the left side surface faces the left side of the vehicle body, and the left-right directions of the airbag 1 and the vehicle body are aligned.

In FIG. 2, the securing tool 4 is positioned on a lower side of the tab 3. As described above, the securing tool 4 is rotatable around an axis parallel to the front-rear direction. Therefore, the up-down position of the securing tool 4 can be changed. In the up-down direction, the orientation of the securing tool 4 during manufacture of the airbag 1 and the orientation of the securing tool 4 during deployment of the airbag 1 attached to the vehicle body may not align.

In the airbag 1 and manufacturing method thereof according to the embodiment, the first region 11 along the lower edge of the deployed airbag 1 is folded back at the first fold line 11a, the second region 12 is folded back at the second fold line 12a in a condition where the first region 11 is folded back, and the first region 11 and the second region 12 are disposed on the right side of the airbag 1. The third region 13 is rolled on the left side of the airbag 1, in other words, on an opposite side of the first region 11 and second region 12. Therefore, when the curtain airbag 1 is disposed with the left surface of the airbag 1 facing outward from the vehicle, the first region 11 and the second region 12 deploy to the right, in other words, toward the inside of the vehicle, and do not deploy outward from the vehicle, even when an inertial force toward the outside of the vehicle acts on the airbag 1. When deployed toward the outside of the vehicle, the closed window glass 53 may break or an airbag may easily exit the vehicle through the open window glass 53. However, the airbag 1 according to the embodiment deploys toward the inside of the vehicle, and therefore, reduction in the occupant protection performance can be suppressed.

Furthermore, during deployment, the first fold line 11a is disposed at the upper edge portion of the door trim 52 such that the first region 11 can be easily deployed to an inner side of the door. Furthermore, the downwardly expanding portion 7a expands to the inner side of the door and can prevent the occupant from impacting the door.

Furthermore, the second region 12 is disposed on a lower side than a strap 9 to which pulling is applied, and therefore, the first region 11 and second region 12 are deployed at a high speed.

Furthermore, providing the temporary stitched portion 20 can prevent the first region 11 and second region 12 from unfolding when the third region 13 is rolled. Furthermore, the temporary stitched portion 20 is provided in the non-expanding portion 8, and therefore, the temporary stitched portion 20 does not interfere with the expansion of the expanding portion 7.

Furthermore, temporarily securing two end portions in the front-rear direction and the intermediate portion of the airbag 1 can prevent the first region 11 and second region 12 from shifting positions with regard to a rolling device when the airbag 1 is rolled using the rolling device.

A temporary stitched portion 20 is provided between the seams 6, and therefore, the temporary stitched portion 20 does not affect expansion of the curtain airbag 1. Furthermore, upper-lower widths of the first region 11 and second region 12 are equal, and therefore the folded back region is minimized. Furthermore, when the up-down position of the first fold line 11a is set, the position of the second fold line 12a is also naturally set, and thus setting the first fold line 11a and second fold line 12a is simple.

Furthermore, the latching hole 10 is formed in the thin third region 13, avoiding the thick folded back first region 11 and second region 12, to facilitate formation of the latching hole 10.

In the aforementioned embodiment, the first fold line 11a is essentially parallel to the lower edge of the airbag 1 but may be formed diagonally so as to intersect with the lower edge of the airbag 1. Even if the first fold line 11a is oblique, the first region 11 and the second region 12 can deploy to the inner side of the vehicle body 50 during expansion and deployment.

The embodiments presently disclosed are to be considered as examples for all points, and are not restrictive. The technical features described in the examples can be combined with each other, and the scope of the invention is intended to include all changes within the scope of the claims and a scope equal to the claims.

EXPLANATION OF SYMBOLS

1 Curtain airbag
2 Inflator
6 Seam
7 Expanding portion
7a Downward expanding portion
8 Non-expanding portion
9 Strap
10 Latching hole
11 First region
11a First fold line
12 Second region
12a Second fold line
13 Third region
20 Temporary stitched portion
50 Vehicle body
52 Door trim

The invention claimed is:

1. A curtain airbag for a vehicle, the curtain airbag comprising:
   a first surface;
   a second surface opposite the first surface;
   a first region along a lower edge;
   a second region adjacent to and above the first region with a first fold line as a first boundary;
   a third region adjacent to and above the second region with a second fold line formed as a second boundary on an opposite side of the first fold line across the second region; and
   a strap having a first end portion for attachment to a body of the vehicle and a second end portion is attached to an end portion in a front-rear direction for pulling in the front-rear direction,
   wherein the first region is folded back at the first fold line so as to face a first surface side of the second region,
   wherein the second region is folded back at the second fold line such that the folded back first region is sandwiched between the second region and the third region,
   wherein the third region is rolled upward on a second surface side, with the rolling starting from the second fold line,
   wherein the first region and the second region are provided to an inward side of the third region, and
   wherein the strap is disposed above the second fold line in a vertical direction and within a range of an upper/lower width of the folded back second region.

2. The curtain airbag according to claim 1 in combination with a body of the vehicle, wherein
   the first fold line is formed for location on an upper edge portion of a door trim of the body of the vehicle.

3. The curtain airbag in combination with the body of the vehicle according to claim 2, wherein
   the first region is disposed on a front side of the body of the vehicleduring deployment, and includes a lower expanding portion that extends below the upper edge portion of the door trim of the body of the vehicle.

4. The curtain airbag according to claim 1, further comprising
   a temporary stitched portion for temporarily retaining the first and second regions folded back at the second fold line.

5. The curtain airbag according to claim 4, wherein
   the temporary stitched portion is provided at an end portion and an intermediate portion in the front-rear direction.

6. The curtain airbag according to claim 4, further comprising:
   an expanding portion demarcated by seams;
   wherein the expanding portion is disposed between the seams.

7. The curtain airbag according to claim 1, wherein widths of the first region and the second region are equal in a vertical direction.

8. The curtain airbag according to claim 1, further comprising
   a locking hole for locking to a rolling device is disposed on the third region.

9. A method of manufacturing the curtain airbag according to claim 1, the method comprising:
   folding back the first region along the lower edge of the curtain airbag at the first fold line such that the first region faces the first surface of the second region adjacent to and above the first region with the first fold line as the first boundary;
   folding back the second region at the second fold line such that the folded back first region is sandwiched between the second region and the third region adjacent and above the second region with the second fold line as a second boundary;
   temporarily retaining the folded back first and second regions and the third region; and
   rolling upward the third region on the second surface side, with the rolling starting from the second fold line.

10. A curtain airbag for a vehicle, the curtain airbag comprising:
    a first surface;
    a second surface opposite the first surface;
    a first region along a lower edge;
    a second region adjacent to and above the first region with a first fold line as a first boundary;
    a third region adjacent to and above the second region with a second fold line formed as a second boundary on an opposite side of the first fold line across the second region;
    wherein the first region is folded back at the first fold line so as to face a first surface side of the second region,
    wherein the second region is folded back at the second fold line such that the folded back first region is sandwiched between the second region and the third region,
    wherein the third region is rolled upward on a second surface side, with the rolling starting from the second fold line, wherein the first region and the second region are provided to an inward side of the third region, and wherein a temporary stitched portion temporarily retains the first and second regions folded back at the second fold line and the third region.

11. A curtain airbag for a vehicle, the curtain airbag comprising:
- a first surface;
- a second surface opposite the first surface;
- a first region along a lower edge;
- a second region adjacent to and above the first region with a first fold line as a first boundary;
- a third region adjacent to and above the second region with a second fold line formed as a second boundary on an opposite side of the first fold line across the second region; and
- a locking hole for locking to a rolling device disposed on the third region, wherein the first region is folded back at the first fold line so as to face a first surface side of the second region, wherein the second region is folded back at the second fold line such that the folded back first region is sandwiched between the second region and the third region, wherein the third region is rolled upward on a second surface side, with the rolling starting from the second fold line, and wherein the first region and the second region are provided to an inward side of the third region.

* * * * *